United States Patent
Arafat et al.

(10) Patent No.: US 10,283,227 B2
(45) Date of Patent: May 7, 2019

(54) SYSTEM USABLE IN NUCLEAR ENVIRONMENT FOR PROVIDING BREATHING GAS

(71) Applicant: WESTINGHOUSE ELECTRIC COMPANY LLC, Cranberry Township, PA (US)

(72) Inventors: Yasir Arafat, Pittsburgh, PA (US); Jeffrey Dederer, Valencia, PA (US); Adam Torrance, Pittsburgh, PA (US); James H. Scobel, Pittsburgh, PA (US); Jonathan C. Durfee, Marks, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 482 days.

(21) Appl. No.: 14/965,120

(22) Filed: Dec. 10, 2015

(65) Prior Publication Data

US 2017/0169906 A1 Jun. 15, 2017

(51) Int. Cl.
| | |
|---|---|
| F17C 9/04 | (2006.01) |
| G21D 1/02 | (2006.01) |
| A62B 11/00 | (2006.01) |
| H02K 7/18 | (2006.01) |
| G21D 3/04 | (2006.01) |
| A62B 7/06 | (2006.01) |

(52) U.S. Cl.
CPC ............ G21D 1/02 (2013.01); A62B 11/00 (2013.01); F17C 9/04 (2013.01); G21D 3/04 (2013.01); H02K 7/1823 (2013.01); A62B 7/06 (2013.01); Y02E 30/40 (2013.01)

(58) Field of Classification Search
CPC ... F17C 7/00; F17C 7/04; A62B 11/00; G21D 1/02
See application file for complete search history.

(56) References Cited

U.S. PATENT DOCUMENTS

| | | | | |
|---|---|---|---|---|
| 5,148,681 A | * | 9/1992 | Lagache ................ | A62B 7/06 62/259.1 |
| 2014/0216021 A1 | * | 8/2014 | Dederer ................ | G21D 1/00 60/327 |

FOREIGN PATENT DOCUMENTS

| | | |
|---|---|---|
| EP | 2071249 B1 | 6/2012 |
| JP | 2008089285 A | 4/2008 |
| JP | 2012233705 A | 11/2012 |

OTHER PUBLICATIONS

PCT/US2016/058567, International Search Report and Written Opinion, dated Jan. 31, 2017, 10 Pages.

* cited by examiner

*Primary Examiner* — Brian M King
(74) *Attorney, Agent, or Firm* — Joseph C. Spadacene; Westinghouse Electric Company LLC

(57) ABSTRACT

A system usable in a nuclear environment provides a reservoir of liquefied breathable gas in fluid communication with a deployment system. The deployment system uses a stream of the breathable gas from the reservoir to operate a gas turbine which runs an electrical generator that is mechanically connected therewith to generate electrical power that is stored in a battery bank. The stream of breathable gas then flows from the turbine and is split between a heat exchanger that is situated in heat exchange relation with the interior region of the main control room and an outlet that provides breathable gas to the control room. The portion of the stream that flows through the heat exchanger cools the main control room. The other portion of the stream that provides breathable gas to the main control room also recirculates the atmosphere in the control room.

10 Claims, 1 Drawing Sheet

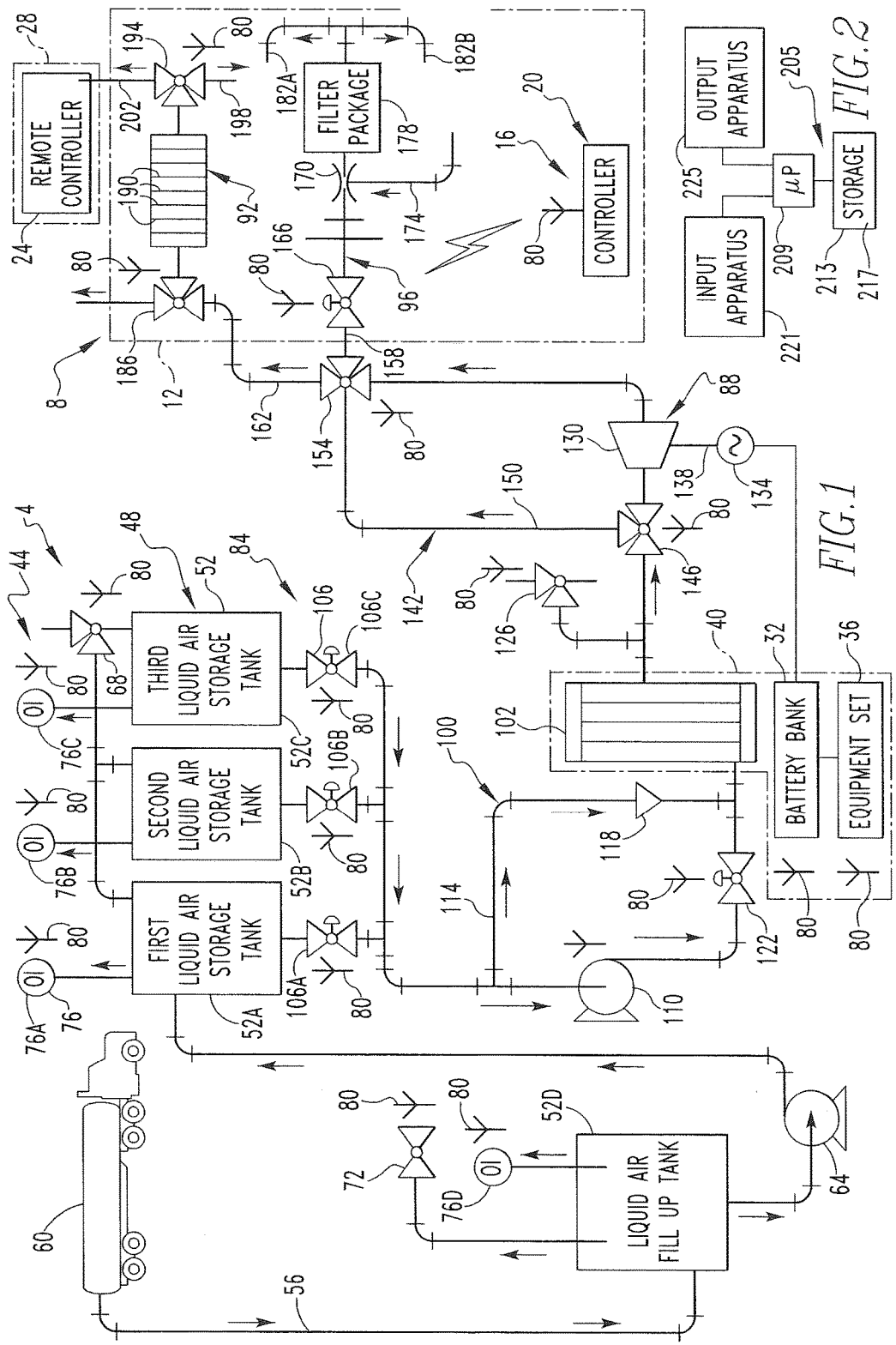

SYSTEM USABLE IN NUCLEAR ENVIRONMENT FOR PROVIDING BREATHING GAS

BACKGROUND

1. Field

The disclosed and claimed concept relates generally to nuclear environments and, more particularly, to a system usable in nuclear environment for providing breathable gas and cooling to an interior region of a location such as a main control room in an emergency or other situation.

2. Related Art

As is generally understood, nuclear power plants and other nuclear environments employ nuclear fission or nuclear fusion for certain purposes. Due to the potential danger that exists in such nuclear environments, numerous control systems and protection systems are implemented. In a nuclear power plant, for instance, the nuclear environment typically includes a main control room where the nuclear reactor and supporting equipment and systems are controlled. While such nuclear environments have been generally effective for their intended purposes, they have not been without limitation.

For instance, the main control room of a nuclear environment typically is occupied by human personnel who are charged with operating the various systems such as control systems and protective systems of the nuclear environment. In the event of an emergency such as a loss of coolant or other such emergency, the main control room can sometimes lose its electrical power feed. This is undesirable since the electrical power feed provides power to run the control systems and protective systems and also powers the needed air conditioning system that controls the environment within the main control room. While backup diesel generators have been proposed for use in a beyond design basis accident (BDBA), such diesel generator based solutions often require both time and manpower. In a rare situation wherein a main diesel generator may be unavailable, the main control room can rapidly become heated and its quality of breathable air can rapidly deteriorate. Batteries are also used but are generally reserved to operate safety-related equipment. Such deterioration of air quality can include depletion of oxygen, increased levels of carbon dioxide and ingress of airborne radioactive particles, all of which are undesirable.

While backup batteries have been proposed for use in a situation where a diesel generator is unavailable, such backup battery systems understandably have a limited capacity, typically twenty-four hours, which may be insufficient for the personnel to carry out all of the safety-related operations. If the various emergency operating procedures and other procedures that are required to be completed during an emergency have not yet been performed by the time the backup batteries are reaching the end of their operational capability (approximately twenty-two hours), an automatic depressurization system (ADS) will proceed to flood the containment. Such a flood is undesirable because of the significant cleanup that will be required afterward. Improvements thus would be desirable.

SUMMARY

An improved system usable in a nuclear environment provides a reservoir of liquefied breathable gas in fluid communication with a deployment system. The deployment system uses a stream of the breathable gas from the reservoir to operate a gas turbine which runs an electrical generator that is mechanically connected therewith to generate electrical power that is stored in a battery bank. The stream of breathable gas then flow from the turbine and are split between a heat exchanger that is situated in heat exchange relation with the interior region of the main control room and an outlet that provides breathable gas to the control room. The portion of the stream that flows through the heat exchanger cools the main control room. The other portion of the stream that provides breathable gas to the main control room also recirculates the atmosphere in the control room.

Accordingly, an aspect of the disclosed and claimed concept is to provide a system that employs a reservoir of liquefied breathable gas which is used to generate electricity and/or cool a main control room in addition to providing breathable gas including oxygen to the main control room.

Another aspect of the disclosed and claimed concept is to provide an improved system that provides an ongoing source of electricity for a control apparatus that controls a nuclear environment.

Accordingly, an aspect of the disclosed and claimed concept is to provide an improved system that is structured for use in conjunction with an interior region of a nuclear environment, the interior region being at least partially enclosed. The system can be generally stated as including a reservoir having stored therein breathable gas whose stored condition is at least one of: at a temperature less than the ambient temperature at the exterior of the reservoir and at a pressure greater than the ambient pressure at the exterior of the reservoir, the reservoir being structured to output a stream of the breathable gas responsive to a command, a control apparatus connected with the reservoir and structured to provide the command to the reservoir in a predetermined situation, and a deployment system that is structured to receive the stream. The deployment system can be generally stated as including at least one of: a heat exchanger that can be generally stated as including a number of flow channels that are in fluid communication with the reservoir and that are situated in heat exchange relation with the interior region, the number of flow channels being structured to receive therethrough at least a portion of the stream and to transfer to it heat from within the interior region, and a generation apparatus that can be generally stated as including a turbine and an electrical generator that are mechanically connected together, the turbine being in fluid communication with the reservoir and being structured to receive therethrough at least a portion of the stream and being operable therefrom to cause the electrical generator to generate electrical power.

BRIEF DESCRIPTION OF THE DRAWINGS

A further understanding of the disclosed and claimed concept can be gained from the following Description when read in conjunction with the accompanying drawings in which:

FIG. 1 is schematic depiction of an improved system in accordance with the disclosed and claimed concept; and FIG. 2 is a schematic depiction of a controller of the system of FIG. 1.

Similar numerals refer to similar parts throughout the specification.

DESCRIPTION

An improved system 4 in accordance with the disclosed and claimed concept is schematically depicted in FIG. 1 as being usable in a nuclear environment 8 such as a nuclear power plant or other nuclear environment. The nuclear environment 8 includes a main control room 12 which has an interior region that is at least partially enclosed. While not expressly depicted herein, it is understood that the main control room 12 includes filters and one-ways pressure valves that enable the main control room 12 to be slightly pressurized, i.e., retained at a pressure at least slightly in excess of the ambient pressure that exists at the exterior of the main control room 12, in order to avoid the ingress of airborne radioactive particles.

The nuclear environment 8 includes a control apparatus 16 that includes various control systems and safety systems and the equipment that corresponds therewith. The control apparatus 16 is, on the whole, distributed throughout the nuclear environment 8 but includes a controller 20 that is situated, at least in part, within the main control room 12 and that is operable to control the various systems of the control apparatus 16. The control apparatus 16 additionally includes a remote controller 24 that is situated in an auxiliary room 28 that is separate from the main control room 12 and that has an interior region that is at least partially enclosed, such as in the fashion of the main control room 12. The control apparatus 16 additionally includes an exemplary battery bank 32 and an exemplary equipment set 36 that are depicted in FIG. 1 as being situated within an equipment room 40. The equipment room 40 has an interior region and, in the depicted exemplary embodiment, is at least partially enclosed. It is understood that FIG. 1 is intended to depict the fact that at least a portion of the battery bank 32 and/or at least some of the equipment of the equipment set 36 are disposed within the equipment room 40, and it is further understood that other control equipment is likely situated elsewhere within the nuclear environment 8.

The inventive system 4 can be said to include a storage tank apparatus 44 that includes a reservoir 48 of liquid air or a formulation of breathable gases that are in a liquefied state. In this regard, it is understood that "liquid air" per se does not exist as a result of air having been liquefied since the various constituents of air each reach their own liquid states at different temperatures and pressures. As such, the expression "liquid air" and variations thereof shall refer broadly to a mixture of gases that are in a liquid form and which, in their gaseous form, would be breathable by humans as air. The reservoir 48 thus includes stored therein liquid air that is in the form of 19-23.5% liquefied oxygen gas with the remainder being liquefied nitrogen gas.

In the depicted exemplary embodiment, the reservoir 48 includes three liquid air storage tanks that are indicated at the numerals 52A, 52B, and 52C, it being noted that the liquid air storage tanks may be individually or collectively referred to herein with the numeral 52. The liquid air storage tanks 52 are double-walled storage tanks having insulation between the walls and which are situated somewhere in the nuclear environment 8, likely outside of any buildings and likely being exposed to the elements. The liquid air storage tanks 52 store therein in liquid form the breathable gas for storage and possible supply during a predetermined event such as an emergency event or other such event. The liquid air storage tanks 52 retain the breathable gas therein in a liquefied state at a temperature of approximately −250° F. and at a pressure of 150-200 psig. This is in contrast to a conventional compressed air storage tank which might store the pressurized air therein at ambient temperature and at perhaps 4,000 psi. The liquid air storage tanks 52 thus store the breathable gas therein in liquid form at a temperature that is below the ambient temperature at the exterior of the liquid air storage tanks 52 and at a pressure that is greater than the ambient pressure at the exterior of the liquid air storage tanks 52.

Since the liquid air storage tanks 52 are not themselves refrigerated and rather rely upon insulation to keep the breathable gas cold, a certain portion of the liquefied contents therein becomes gaseous and therefore must be vented away. This results in a certain loss in the contents, which may be on the order of 0.4% of the contents per day. This breathable gas that has become gaseous and has been vented away must be occasionally replaced. Moreover, since the vented gas typically is approximately 95% nitrogen gas, the balance between liquefied oxygen gas and liquefied nitrogen gas within the interior of the liquid air storage tanks 52 can change over time.

As such, the storage tank apparatus 44 further includes a fill up tank 52D that is connectable by a fill up line 56 with a replenishment truck 60 that provides to the fill up tank 52D a specific formulation of liquefied oxygen gas and liquefied nitrogen gas which, when supplied to the liquid air storage tanks 52, will cause the relative concentrations of liquefied oxygen and liquefied nitrogen to be such that the oxygen concentration lies in the aforementioned range of 19-23.5% oxygen.

As is understood in the relevant art, the replenishment truck 60 typically is able to rapidly discharge its contents, and thus the storage tank apparatus 44 is configured to provide the fill up tank 52D to rapidly receive the contents of the replenishment truck 60 and to temporarily store the replenishment liquefied gases therein. The contents of the fill up tank 52D are then provided via a fill up pump 64 that communicates the contents of the fill up tank 52D to the liquid air storage tanks 52. The fill up tank 52D includes a fill up vent valve 72 that is in the form of a pressure relief valve or other such valve that releases gases only at certain pressures or when it receives instructions to do so from the controller 20.

In this regard, it can be seen that the fill up vent valve 72 includes an antenna 80 that is intended to represent the fact that the fill up vent valve 72 is in wireless communication with the controller 20, which likewise includes an antenna 80. It can also be seen that numerous other components of the system 4 and of the nuclear environment 8 likewise include antennae 80 that likewise provide wireless communication with the controller 20. Such antennae 80 are representative of wireless communication and control between the controller 20 and various other components, but it is understood that such communication and control with the controller 20 can be via wired communication or other communication media without departing from the present concept.

The liquid air storage tanks 52 likewise include a storage vent valve 68 that vents to an exhaust (and not to the atmosphere) the content of the liquid air storage tanks 52 that has become gaseous. Such a release of gas may be only at certain pressures or may be when the storage vent valve 68 receives instructions to do so from the controller 20.

The liquid air storage tanks 52A, 52B, and 52C, and the fill up tank 52 each include an oxygen indicator indicated at the numerals 76A, 76B, 76C, and 76D, respectively, it being noted that the oxygen indicators can also be individually or collectively referred to herein with the numeral 76. The oxygen indicators 76 are provided to communicate to the controller 20 telemetry data that is representative of the oxygen content of the liquefied gases that are stored in the liquid air storage tanks 52 and the fill up tank 52D in order to ensure that the contents of the liquid air storage tanks 52, as periodically replenished by the fill up tank 52D and the truck 60, have an oxygen content within the aforementioned range of 19-23.5% oxygen.

The inventive system 4 further includes a deployment system 84 that is in fluid communication with the reservoir 48 and that is configured to deploy a stream of breathable gas from the liquid air storage tanks 52 to the main control room 12 or elsewhere in the nuclear environment 8. The deployment system 84 advantageously includes a generation apparatus 88 that is in fluid communication with the reservoir 48 and that is configured to generate electricity by harnessing the mechanical energy that is available from the stream of breathable gas when it is provided in a compressed and liquefied state from the reservoir 48 and is, in turn, delivered by the deployment system 84 to the main control room 12 and elsewhere in the nuclear environment 8. The generated electricity is usable to recharge the battery bank 32 and to operate the equipment set 36. In this regard, it is understood that the battery bank 32 is maintained in a fully charged condition at all times by the AC power feed that powers the main control room 12, for example. In an emergency situation or other situation where the generation apparatus 88 is operated by the stream, the generated electrical power is used to recharge the battery bank 32 and to power the equipment set 36.

The deployment system 84 further includes a heat exchanger 92 that can receive a portion of the stream of breathable gas from the reservoir 48 and that is situated in heat transfer relation with the main control room 12 and, more particularly, with the atmosphere within the interior of the main control room 12. The heat exchanger 92 is operable to provide cooling to the main control room 12 by transferring heat from the atmosphere in the main control room 12 to the portion of the stream that flows through the heat exchanger 92.

The deployment system 84 further includes a delivery system 96 that delivers a portion of the stream of breathable gas to the interior of the main control room 12 to replenish the breathable air for the personnel that are situated within the interior of the main control room 12. The delivery system 96 also recirculates and filters the atmosphere in the main control room 12.

Furthermore, the deployment system 84 includes a connection system 10 that can be said to include a number of flow elements that include pipes, valves, and other fluid passages that are in fluid communication with one another and with the reservoir 48. As employed herein, the expression "a number of" and variations thereof shall refer broadly to any non-zero quantity, including a quantity of one.

More particularly, the connection system 100 can be said to include a set of supply valves that are indicated generally at the numerals 106A, 106B, and 106C and that are connected with the liquid air storage tanks 52A, 52B, and 52C, respectively, and an ambient evaporator 102. It is noted that the supply valves can be individually or collectively referred to herein at the numeral 106. The supply valves 106 provide the stream of breathable gas to the ambient evaporator 102 which, in the depicted exemplary embodiment, is situated within the interior of the equipment room 40. The connection system 100 further includes a cryogenic supply pump 110 that is provided between the supply valves 106 and the ambient evaporator 102 and that is electrically operable to increase the pressure of the stream of breathable gas that is being provided to the ambient evaporator 102.

The connection system 100 additionally includes a parallel leg 114 and a check valve 118 that additionally are in fluid communication in parallel with the leg of the connection system 100 that includes the supply pump 100. The parallel leg 114 is provided in order to directly supply the stream of breathable gas to the ambient evaporator 102 in the event that the supply pump 110 should fail and also in the event that the pressure of the contents of the liquid air storage tanks 52 is already of sufficiently high pressure that the supply pump 110 is unnecessary. The check valve 118 is provided in order to avoid the output from the supply pump 110 flowing back into the parallel leg 114. The connection system 100 further includes a control valve 122 that is provided between the supply pump 110 and the ambient evaporator 102 and that is employed to provide an additional level of control over the flow of the stream of breathable gas from the supply pump 110 to the ambient evaporator 102.

The ambient evaporator 102 is a heat exchanger that receives heat from the air in the atmosphere of its immediate environment which, in the depicted exemplary embodiment is the equipment room 40. The ambient evaporator 102 employs the received heat to convert the largely liquid content that is input to it from the reservoir 48 into largely gaseous output that is communicated to the generator apparatus 88 and/or the heat exchanger 92 and/or the delivery system 96. Since the ambient evaporator 102 is reliant upon heat in its immediate environment, it desirably is situated such that the heat in the atmosphere in the immediate vicinity of the ambient evaporator 102 includes sufficient heat to evaporate the stream. It is also desirable that the dimensions of the ambient evaporator 102 and the flow rate of the stream thereto are such that the stream can be converted from the largely liquid state at the inlet of the ambient evaporator 102 to a completely or largely gaseous state at the outlet of the ambient evaporator 102. It is understood that the input to the ambient evaporator 102 may not be completely liquid and that the output from the ambient evaporator 102 may not be completely gaseous, but it is nevertheless understood that the ambient evaporator 102 will reduce the liquid content of the stream and will increase the gaseous content of the stream from the time that the stream enters the ambient evaporator 102 to the point where the stream exits therefrom.

At the downstream end of the ambient evaporator 102, the stream of breathable gas will be of a higher pressure than at the inlet to the ambient evaporator 102. An evaporator relief valve 126 is provided in order to vent a portion of the stream to the atmosphere if needed.

The generation apparatus 88 is situated downstream of the ambient evaporator 102 and is in fluid communication with the reservoir 48. The generation apparatus 88 includes a gas turbine 130 that can receive at least a portion of the stream of breathable gas from the ambient evaporator 102 and that is operable from the pressure and momentum of the at least portion of the stream to generate electricity therefrom. More specifically, the generator apparatus 88 additionally includes an electrical generator 134 and a shaft 138 that mechanically connect the electrical generator 134 with an operating shaft of the turbine 130. The movement of the turbine 130 rotate the shaft 138 and, in turn, operates the electrical generator 134 to generate electrical power that is used to charge the battery bank 32. As a general matter, it is noted that the electrical power that is generated by the electrical generator 134 is intended, at least in part, to charge and operate the equipment set 36, and such electrical power is stored by charging the battery bank 32. It is understood that the equipment set 36 and the battery bank 32 can generate significant amounts of heat, and the ambient evaporator 102 is thus provided in the equipment room 40 in heat exchange relation with the atmosphere in the equipment room 40 whereby the heat that is generated by the battery bank 32 and the equipment set 36 is used to heat and thus evaporate the stream of breathable gas in the ambient evaporator 102. Likewise, the ambient evaporator 102 provides cooling to the battery bank 32 and the equipment set 36 in order to resist malfunctioning thereof.

The connection system 100 additionally includes a bypass leg 142 that includes a bypass valve 146 that is situated between the turbine 130 and the ambient evaporator 102. The bypass leg 142 further includes a bypass flow element 150 in fluid communication with the bypass valve 146 that is, in turn, also connected in fluid communication with a supply divider valve 154. Depending upon the needs of the given situation, the supply divider valve 154 is operable responsive to instructions received from the controller 20 to split the stream of breathable gas between the turbine 130 and the bypass flow element 150 in certain circumstances. For instance, it may be desirable to provide relatively more flow of the stream directly to the heat exchanger 92 and/or the delivery system 96 if such additional flow is more important than generating electricity with the generation apparatus 88. For instance, this might be done during the initial states of an emergency situation where the battery bank 32 is already fully charged, by way of example.

It can be seen that the supply divider valve 154 is in fluid communication with and is situated downstream of the turbine 130 and thus receives from the turbine 130 and from the bypass leg 142 substantially the entirety of the stream of breathable gas. That is, the supply divider valve 154 receives the entirety of the stream of breathable gas except for any portions that may have been vented or had leaked or been otherwise lost.

The supply divider valve 154 thus can be said to receive the stream of breathable gas from the turbine 130 and/or from the bypass leg 142 and the supply divider valve 154, in turn, divides the received stream of breathable gas between the heat exchanger 92 and the delivery system 96. In this regard, the supply divider valve 154 is in wireless communication with the controller 20 and receives instructions from the controller 20 that cause the supply divider valve 154 to proportion, i.e., divide, the stream of breathable gas between the heat exchanger 92 and the delivery system 96 responsive to the instructions received from the controller 20. At least a portion of the stream is generally always going to be provided to the delivery system 96, which includes a delivery leg 158, a delivery control valve 166, and an eductor 170 having an outlet that provides as an output at least a portion of the stream of breathable gas. As is generally understood in the relevant art, an eductor such as the eductor 170 receives an additional flow through a fluid inlet which, in the depicted exemplary embodiment, is a recirculation inlet 174 that draws into the eductor 170 at least a portion of the atmosphere within the interior of the main control room 12. As such, the flow of at least a portion of the stream through the eductor 170 additionally draws through the recirculation inlet 174 a portion of the atmosphere in the main control room 12 to thereby recirculate at least a portion of the atmosphere in the main control room 12 while providing new breathable gas to the main control room 12. Since the output from the eductor 170 includes recirculated air that has been inside the interior of the main control room 12, which may have airborne radioactive particles therein, the delivery system 96 further includes a filter apparatus 178. The output of the eductor 170 is provided to the filter apparatus 178, which filters from the received output any airborne radioactive particles. The delivery system 96 additionally includes a pair of breathable gas outlets 182A and 182B that receive the output from the filter apparatus 178 and provide it to the interior of the main control room 12 to provide recirculated breathable air.

As mentioned above, the main control room 12 in certain situations, such as an emergency situation, desirably has an ambient pressure therein that is greater than the ambient pressure at the exterior of the main control room 12. This advantageously resists the ingress of radioactive contaminants. As a general matter, and during a predetermined event such as an emergency event, personnel in the main control room 12 are typically required to perform periodic checks and other evaluations to assess the quantity of airborne radioactive particles and other contaminants within the main control room 12. If the supply of air through the delivery leg 158 is of a sufficient rate that it can maintain in the main control room 12 a certain elevated pressure, the requirements on personnel to perform such periodic checks can be reduced. As such, the supply divider valve 154 may be operated by the controller 20 to maintain such a flow rate, if such flow rate is feasible in view of the ambient temperature that exists in the main control room 12.

More specifically, the portion of the stream that is not provided to the delivery leg 158 is instead delivered to the heat exchanger 92. More specifically, the heat exchanger 92 includes a heat exchanger leg 162, a heat exchanger vent valve 186, and a number of flow channels 190. The portion of the stream that flows to the heat exchanger 92 first flows through the heat exchanger leg 162 and then to the heat exchanger vent valve 186. The heat exchanger vent valve 186 can, if needed, vent a portion of the flow that is in the heat exchanger leg 162 to the atmosphere depending upon the needs of the particular application.

The heat exchanger vent valve 186 communicates any non-vented portion of the stream from the heat exchanger leg 162 to the flow channels 190. The flow channels 190 are in fluid communication with the reservoir 48 and are situated in heat exchange relation with the main control room 12 and, more particularly, with the atmosphere within the interior region of the main control room 12. The portion of the stream that is supplied to the flow channels 190 is almost certainly of a lower temperature than the atmosphere within the interior of the main control room 12, and the flow channels 190 are thus configured to transfer heat from the atmosphere of the main control room 12 into the portion of the stream that is flowing through the flow channels 190 in order to advantageously provide cooling to the interior of the main control room 12. In this regard, the heat exchanger 92 may be affixed to the concrete of the main control room 12 and may receive heat via conduction from the concrete into the flow channels 190 or otherwise convectively receive heat from the atmosphere in the main control room 12 to provide cooling therein.

The stream, after flowing through the flow channels 190, is received at an outlet divider valve 194 that is in fluid communication with the reservoir 48 and that is connected with a control room leg 198 and an auxiliary leg 202. Responsive to instructions received at the outlet divider valve 194 from the controller 20, the outlet divider valve 194 is operable to proportion or otherwise divide the portion of the stream from the heat exchanger 92 to output and provide breathable air to the main control room 12 via the control room leg 198 and/or to the auxiliary room 28 via the auxiliary leg 202. Since the portion of the stream that flows through the heat exchanger 192 is pure gas, i.e., it does not include a recirculated component from an atmosphere that may be contaminated with airborne radioactive particles, the control room leg 198 and the auxiliary leg 202 do not need to be filtered prior to being delivered to the main control room 12 and/or the auxiliary room 28, respectively. Depending upon the instructions received by the outlet divider valve 194 from the controller 20, the portion of the stream from the heat exchanger 92 can be provided as needed to either the main control room 12 or the auxiliary room 28 depending upon the needs of the situation.

The controller 20 is depicted in greater detail in FIG. 2. The controller 20 includes a processor apparatus 205 that includes a processor 209 and a storage 213. The processor 209 can be any of a wide variety of processors, including microprocessors and the like, without limitation. The storage 213 can be any of a wide variety of storage devices that operate as a non-transitory medium and that may include any one or more of RAM, ROM, EPROM, FLASH, and the like without limitation. The storage 213 has stored therein a number of routines 217 in the form of instructions which, when executed on the processor 209, cause the controller 20 to perform various operations such as control operations and the like to generate instructions that may be communicated to various parts of the nuclear environment 8 and/or the system 4.

The controller 20 further includes an input apparatus 221 that provides input signals to the processor apparatus 205. Furthermore, the controller 20 includes an output apparatus 225 that receives output signals from the processor apparatus 205. By way of example, the input apparatus 221 can include input components such as pushbuttons and user interfaces with which the personnel within the main control room 12 interface with and provide inputs to the controller 20. The input apparatus 221 can further include the input components of the wireless transceivers that are represented by the antennae 80 that provide telemetry from the various oxygen indicators 76 and the various valves and the various other components of the connection system 100.

Similarly, the output apparatus 225 can include the output components of the wireless transceivers that are represented by the antennae 80 and which receive and communicate output signals from the processor apparatus 205 to, for instance, the various valves such as the bypass valve 146, the supply divider valve 154, and the outlet divider valve 194, by way of example. The output apparatus 225 can further include visual outputs and other outputs that provide information that can be perceived by the personnel in the main control room 12. Other input and output devices will be apparent to one of ordinary skill in the art.

The advantageous system 4 therefore advantageously, when triggered, employs the liquid air storage tanks 52 and the mechanical potential and cooling potential of the liquid air that is stored therein to generate electricity and to provide cooling and breathable gas to at least the main control room 12 of the nuclear environment 8. The system 4 can be triggered in any of a variety of ways, such as by the controller 20 detecting the existence of airborne radioactive particles in the main control room 12, or by the controller 20 detecting a loss of an AC power feed to the main control room 12, or by being actuated manually.

The mechanical potential in the stored liquid air exists in the stream of breathable gas that is evaporated to a gaseous state and that is provided to the turbine 130 to generate electrical power. The electrical power is used to recharge the battery bank 32 and to operate the equipment set 36, and heat that is generated thereby is used to heat the ambient evaporator 102 and to evaporate the stream of breathable gas flowing therethrough. The stream of breathable gas can be provided to the generation apparatus 88 to generate the electricity or, if needed, the stream can in whole or in part bypass the turbine 130 by flowing it through the bypass leg 142. The cooling potential of the stream of breathable gas is used to provide cooling to the main control room 12 by flowing it through the heat exchanger 92, and a portion of the stream of breathable gas is supplied as breathable gas to the interior of the main control room 12 via the eductor 170, which generally serves as a gas outlet.

The various portions of the stream that are provided to the generation apparatus 88, to the heat exchanger 92, and to the delivery system 96 are controllable based upon instructions received from the controller 20. In this regard, the portion of the stream that can be seen as being of the greatest importance, is that which is provided to the delivery leg 158 for provision of breathable gas to the main control room 12. Such a flow is, as mentioned above, the most important, and also represents the smallest portion of the stream of breathable gas. The portion of the stream that flows to the heat exchanger 92 through the heat exchange leg 162 can be said to be of moderate importance and consumes a moderate proportion of the content of the stream. The flow to the generation apparatus 88 can be seen as being generally the least important to the system 4 but as consuming the relatively greatest proportion of the stream of breathable gas. As such, the controller 20 and the routines 217 rely heavily upon the various telemetry that is provided via the antennae 80 in order to permit the controller 20 to control the various flows through the connection system 100 in order to achieve the greatest value to the nuclear environment 8 that can be provided by the liquid air stored in the reservoir 48. Other variations and advantages will be apparent to one of ordinary skill in the art.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A system structured for use in conjunction with an interior region of a nuclear environment, the interior region being at least partially enclosed, the system comprising:
   a reservoir having stored therein breathable gas whose stored condition is at least one of at a temperature less than the ambient temperature at the exterior of the reservoir and at a pressure greater than the ambient pressure at the exterior of the reservoir, the reservoir being structured to output a stream of the breathable gas responsive to a command;
   a control apparatus connected with the reservoir and structured to provide the command to the reservoir in a predetermined situation;
   a deployment system that is structured to receive the stream, the deployment system comprising
      a generation apparatus comprising a turbine and an electrical generator that are mechanically connected together, the turbine being in fluid communication with the reservoir and being structured to receive therethrough at least a portion of the stream and being, operable therefrom to cause the electrical generator to generate electrical power;
      wherein the deployment system further comprises a delivery system having an outlet that is in fluid communication with the interior region, the outlet being in fluid communication with the turbine and being situated downstream of the turbine, the outlet being, structured to deliver to the interior region at least a portion of the stream to provide breathable gas to the interior region; and wherein the deployment system further comprises a bypass leg, the bypass leg comprising a valve and a fluid passage, the valve being in fluid communication with the turbine and being situated between the turbine and the reservoir, fluid passage being in fluid communication between the valve and the outlet, the valve being structured to operate responsive to a number of instructions received from the control apparatus to divide the stream responsive to the number of instructions between the fluid passage and the generation apparatus.

2. The system of claim 1 wherein the deployment system further comprises a heat exchanger comprising a number of flow channels that are in fluid communication with the reservoir and that are situated in heat exchange relation with the interior region, the number of flow channels being structured to receive therethrough at least a portion of the stream and to transfer to it heat from within the interior region, the deployment system further comprising another valve that is in fluid communication with the turbine and the fluid passage, the another valve being situated downstream of the turbine and being structured to operate responsive to a number of other instructions received from the control apparatus, the another valve being structured to receive from the turbine and the fluid passage the stream and to divide it responsive to the number of other instructions between the outlet and the heat exchanger.

3. A system structured for use in conjunction with an interior region of a nuclear environment, the interior region being at least partially enclosed, the system comprising:

a reservoir having stored therein breathable gas whose stored condition is at least one of at a temperature less than the ambient temperature at the exterior of the reservoir and at a pressure greater than the ambient pressure at the exterior of the reservoir, the reservoir being structured to output a stream of the breathable gas responsive to a command a control apparatus connected with the reservoir and structured to provide the command to the reservoir in a predetermined situation;

a deployment system that is structured to receive the stream, the deployment system comprising at least one of:

a heat exchanger comprising a number of flow channels that are in fluid communication with the reservoir and that are situated in heat exchange relation with the interior region, the number of flow channels being structured to receive therethrough at least a portion of the stream and, to transfer to it heat from within the interior region, and a generation apparatus comprising a turbine and an electrical generator that are mechanically connected together, the turbine being in fluid communication with the reservoir and being structured to receive therethrough at least a portion of the stream and being operable therefrom to cause the electrical generator to generate electrical power, and wherein the control apparatus comprises an equipment set, and wherein at least a portion of the electrical power is generated in order to operate at least a portion of the equipment set.

4. The system of claim 3 wherein the control apparatus comprises a battery bank, and wherein at least a portion of the electrical power is supplied to the battery bank to charge at least a portion of the battery bank.

5. The system of claim 4 wherein the battery bank is at least partially situated within another interior region of the nuclear environment, the another interior region being at least partially enclosed, and wherein the deployment system further comprises an ambient evaporator that is in heat exchange relation with the atmosphere inside the another interior region, the ambient evaporator being structured to receive as an input from the reservoir the stream in a first condition and being further structured to provide as an output the stream in a second condition, the stream in the second condition being one having relatively less liquid content and relatively more gaseous content than the first condition.

6. The system of claim 5 wherein the deployment system further comprises a pump that is in fluid communication with the reservoir and is structured to increase the pressure of the stream provided to turbine via the ambient evaporator.

7. The system of claim 3 wherein the equipment set is at east partially situated within another interior region of the nuclear environment, the another interior region being at least partially enclosed, and wherein the deployment system further comprises an ambient evaporator that is in heat exchange relation with the atmosphere inside the another interior region, the ambient evaporator being structured to receive as an input from the reservoir the stream in a first condition and being further structured to provide as an output the stream in a second condition, the stream in the second condition being one having relatively less liquid content and relatively more gaseous content than the first condition.

8. The system of claim 7 wherein the deployment system further comprises a pump that is in fluid communication with the reservoir and is structured to increase the pressure of the stream provided to the ambient evaporator.

9. The system of claim 3 wherein the deployment system further comprises a delivery system having an outlet that is in fluid communication with the interior region, the outlet being in fluid communication with the reservoir and being structured to deliver to the interior region as an output at least a portion of the stream to provide breathable gas to the interior region.

10. The system of claim 9 wherein the outlet is an eductor that is structured to recirculate the atmosphere within the interior region by providing as at least a portion of the output at least a portion of the atmosphere that is situated within the interior region, and wherein the deployment system further comprises a filter apparatus that is structure to receive the output and to filter contaminants therefrom before discharging the output into the interior region.

* * * * *